United States Patent [19]

Zobel et al.

[11] 4,431,874
[45] Feb. 14, 1984

[54] BALANCED CURRENT MULTIPLIER CIRCUIT FOR A SUBSCRIBER LOOP INTERFACE CIRCUIT

[75] Inventors: Don W. Zobel, Tempe; W. Eric Main, Mesa; W. David Pace, Tempe; Dennis L. Welty, Mesa, all of Ariz.

[73] Assignee: Motorola, Inc., Schaumburg, Ill.

[21] Appl. No.: 305,013

[22] Filed: Sep. 24, 1981

[51] Int. Cl.³ .............................................. H04B 1/58
[52] U.S. Cl. ......................... 179/170 NC; 179/170 T
[58] Field of Search ............ 179/81 R, 170 R, 170 T, 179/170 NC

[56] References Cited

U.S. PATENT DOCUMENTS

| | | | |
|---|---|---|---|
| 4,004,109 | 1/1977 | Boxall | 179/170 NC |
| 4,041,252 | 8/1977 | Cowden | 179/170 NC |
| 4,203,012 | 5/1980 | Boxall | 179/170 NC |
| 4,272,656 | 6/1981 | Nishikawa | 179/170 NC |
| 4,275,277 | 6/1981 | Ferrieu | 179/170 NC |
| 4,300,023 | 11/1981 | Kelley et al. | 179/170 NC |

OTHER PUBLICATIONS

"3081 and 3082 Subscriber Line Interface Circuits (SLIC)"; ITT North Microsystems Divisions Product Bulletin; Jun. 1978; pp. 1-4.
L. Brown & B. Bynum; "One Chip Closes in on SLIC Function"; Electronic Design; Sep. 1980; pp. 85-91.

*Primary Examiner*—A. D. Pellinen
*Assistant Examiner*—Randall P. Myers
*Attorney, Agent, or Firm*—Michael D. Bingham

[57] ABSTRACT

A balanced multiplier circuit for a subscriber loop interface circuit (SLIC) which provides both loop current to a two-wire bidirectional subscriber loop and suppression of longitudinal signals generated at the two-wire loop input to the SLIC while maintaining the midpoint load voltage at half the available power supply voltage applied to the SLIC.

13 Claims, 3 Drawing Figures

FIG. 1 —PRIOR ART—

BALANCED CURRENT MULTIPLIER CIRCUIT FOR A SUBSCRIBER LOOP INTERFACE CIRCUIT

BACKGROUND OF THE INVENTION

1. Field of the Invention

This invention relates to current multiplier circuits and, more particularly, to a balanced multiplier circuit for use with a subscriber loop interface circuit (SLIC) for balancing a load current supplied by the SLIC.

2. Description of the Prior Art

SLICs suited for fabrication as an integrated circuit that are designed to replace the hybrid transformer circuit generally used in telephone line central office equipment, PABX and Subscriber carrier equipment providing signal separation for two-wire differential to four-wire single-ended conversions and suppression of longitudinal signals at the two-wire input are well-known. For example, U.S. Pat. No. 4,004,109 describes such a SLIC. Moreover, a SLIC providing the functions described above is manufactured by Motorola, Inc. as a standard product identified as the MC3419. Furthermore, the operation of the MC3419 is disclosed in U.S. Pat. No. 4,300,023 which is assigned to Motorola, Inc.

Besides providing AC signal conversion and longitudinal signal suppression, the SLIC must provide a DC current to the two-wire subscriber loop to power the particular load coupled thereto. For instance, if a telephone is connected to the two-wire inputs of the SLIC, the DC line current powers up the telephone. One significant aspect then of the SLIC is to maintain the midpoint voltage of the load centered with respect to the power supply voltage of the SLIC. This may be necessary to prevent distortion of the AC signals appearing across the Tip and Ring terminals (the two-wire inputs) of the SLIC which otherwise may occur if the load voltage was skewed towards either side of the power supply voltage.

Another important feature of the SLIC is to provide suppression of longitudinal or common mode signals that appear at the two-wire input thereof. There is nearly always some longitudinal signals present due to the coupling of the subscriber load equipment via telephone lines to the Tip and Ring inputs of the SLIC. Most SLICs include circuitry for suppressing longitudinal signals. One problem with some SLICs is that these SLICs can operate correctly only if the longitudinal signal currents do not exceed the loop current supplied by the SLIC. Since some subscriber equipment, such as a telephone, may be located some distance from the central office located SLIC, the telephone line resistance reduces the available line current that can be supplied by the SLIC. Unfortunately, longitudinal signal currents generally increase with extended telephone lines. Hence, it is possible, using contemporary SLICs, to have longitudinal signals greater than can be handled by the SLIC which is undesirable.

Additionally, some contemporary SLICs require Darlington transistors externally coupled between the two-wire inputs and the SLIC to provide sufficient DC current multiplication to the subscriber loop. Thus, the subscriber loop and the SLIC operate as a high current gain loop and as such may be subject to oscillations as understood. To prevent oscillations, SLICs generally require a pair of frequency compensation capacitors. The need for such capacitors not only increase component count but is an expense to the user of SLICs which is desirable to eliminate.

Still further, some SLICs, as described above, have an internal circuit for centering the load voltage which is typically referred to as a "C-circuit". This internal circuit also provides a high gain loop which requires an additional external pin for coupling to additional frequency compensation capacitor. It is desirable to eliminate external pin count as well as external required capacitors to reduce expense of the SLIC to the user.

Thus, there exists a need for a SLIC to overcome the aforementioned problems generally associated with contemporary integrated SLICs.

BRIEF SUMMARY OF THE INVENTION

Accordingly, it is an object of the present invention to provide an improved subscriber loop interface circuit.

Another object of the present invention is to provide an improved subscriber loop interface circuit capable of both sourcing and sinking currents at the respective subscriber loop terminals of the subscriber loop interface circuit.

Still another object of the present invention is to provide an improved subscriber loop interface circuit which is capable of rejecting longitudinal signals having current magnitudes greater than the loop current supplied by the subscriber loop interface circuit to the subscriber loop.

In accordance with the above and other objects there is provided a subscriber loop interface circuit which is adapted to be coupled between a two-wire bidirectional subscriber loop transmission path and a pair of two-wire unidirectional transmission paths for providing signal conversion therebetween and including current amplifier means the improvement of which comprises the current amplification means being capable of sourcing and sinking current at the respective subscriber loop terminals for providing rejection of longitudinal signals having current magnitudes that exceed the magnitude of the subscriber loop current provided by the subscriber loop interface circuit to the subscriber loop.

DETAILED DESCRIPTION OF THE PREFERRED EMBODIMENT

Figure 1:
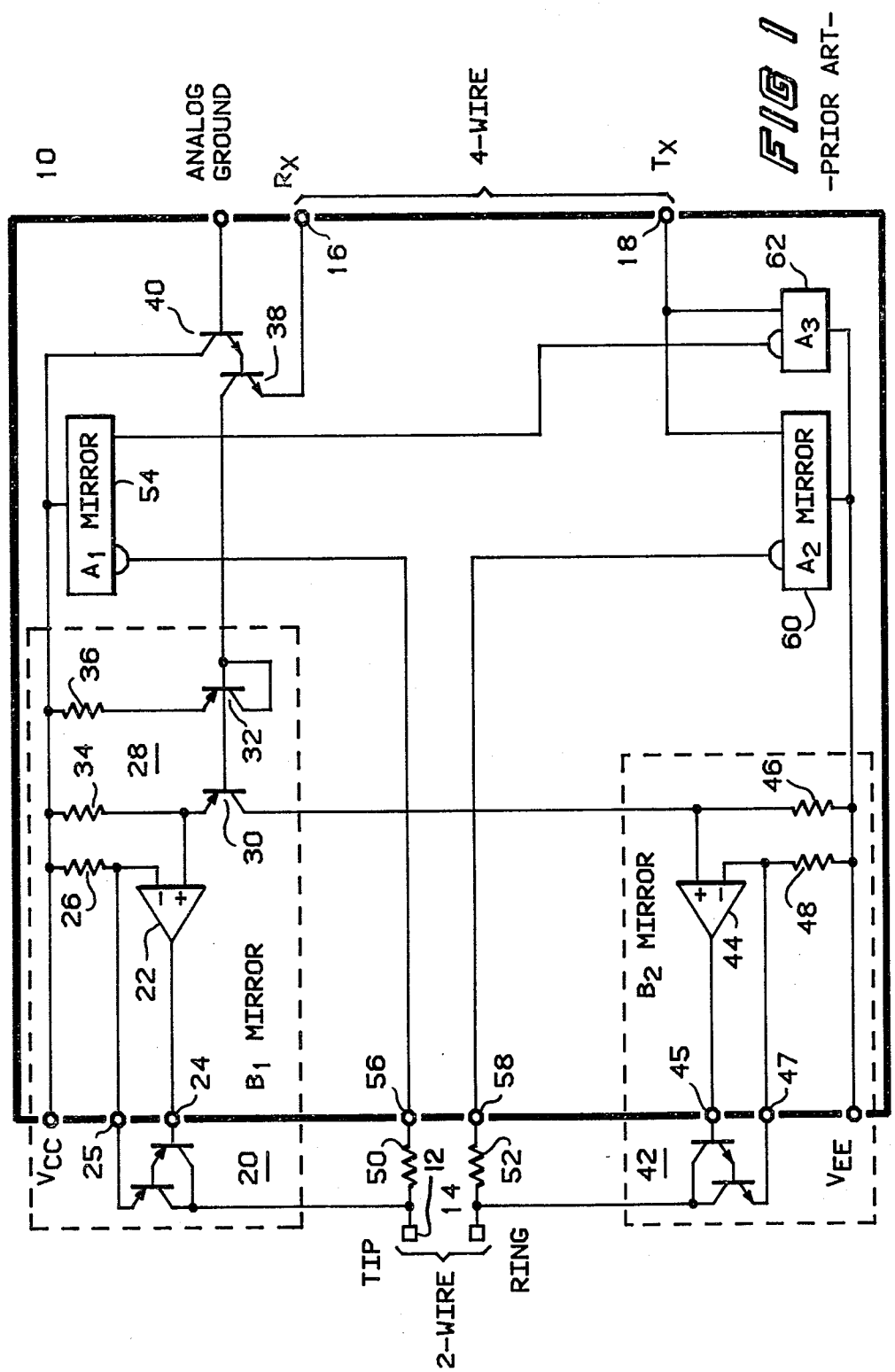
FIG. 1 is a simplified schematic and block diagram of a prior art SLIC.

Referring to FIG. 1 where is shown a simplified schematic of SLIC 10 which is known in the art. As indicated by those components lying within the block, SLIC 10 is suited for fabrication in integrated circuit form. An example of a prior art SLIC is the aforementioned Motorola, Inc. MC3419. The SLIC is coupled between a subscriber two-wire bidirectional signal path at Tip and Ring terminals 12 and 14 and to a pair of two-wire unidirectional signal paths (having a common ground wire) at terminals $R_X$, $T_X$, 16 and 18 respectively. SLIC 10 comprises a plurality of current mirrors generally referred to in the art as the A current mirrors and the B current mirrors. As illustrated, the B1 mirror couples the Tip terminal to the two-wire output portion of SLIC 10 and is comprised of external PNP Darlington transistor 20 and operational amplifier 22, the output of which is connected to the base of transistor 20 at terminal 24. The inverting input of operational amplifier 22 is coupled with the emitters of transistor 20 through resistor 26 to a source of operating potential $V_{CC}$, typically ground reference. The non-inverting input of amplifier 22 is coupled to an output of current mirror 28 comprising transistors 30 and 32. The emitters of transistors 30 and 32 are returned to $V_{CC}$ through resistors 34 and 36 respectively. The output of current mirror 28 is taken at the emitter of transistor 30. The collector of transistor 32 is returned to its base and is coupled to the collector of transistor 38. The emitter of transistor 38 is coupled to terminal $R_X$ and as is understood is DC coupled via an external resistor connected between $R_X$ and $T_X$; the base of this transistor is coupled to the emitter of transistor 40. Transistor 40 has its base coupled to an external pin at which is supplied analog ground; the collector there being returned to $V_{CC}$. The output of the B1 mirror circuit is connected to the Tip terminal at the collector outputs of transistor 20.

Similarly, B2 mirror circuit is coupled between the Ring terminal and the two-wire circuit portion of SLIC 10 and includes a NPN Darlington transistor 42 external to SLIC 10, and operational amplifier 44. The non-inverting input of amplifier 44 is coupled with the collector of transistor 30 of the B1 mirror circuit and returned to $V_{EE}$ through resistor 46. The inverting input of amplifier 44 is coupled with the emitters of transistor 42 through resistor 48 to $V_{EE}$.

A pair of current sensing resistors 50 and 52 are connected to Tip and Ring terminals 12 and 14 respectively. The other end of resistor 50 is coupled to the input (symbolized by the half-circle) of A1 mirror 54 at terminal 56. The other end of resistor 52 is similarly coupled at terminal 58 to the input of A2 mirror 60. An output of mirror 54 is supplied to the input of A3 mirror 62. Outputs of both the A2 mirror 60 and A3 mirror 62 are connected together to terminal $T_X$.

Briefly, when a load is supplied across Tip and Ring, a DC current flows in resistors 50, 52 and mirrors 54, 60. Control outputs of mirrors 54, 60 are then on, to supply an input current to mirror 62 thereby turning its control output on whereby transistor 38 is rendered conductive. This condition turns on the B1 and B2 mirror circuits to supply loop line current to the load. By using predetermined current gain ratios, the small current sensed through resistors 50, 52 (these resistors having a large value) is minimized on board the integrated SLIC 10 chip while the loop current sourced to the Tip terminal is made sufficient to drive the load. For example, by ratioing resistors 34:26 and 46:48 the current gain of the B mirrors can be matched and be K times the current supplied to the B1 mirror. Ideally, the current sourced through B1 mirror to Tip terminal 12 is returned through the load and sinked by the B2 mirror. As one example of the above, if resistors 34 and 46 are made 95 times greater than resistors 26 and 48, the current gain through the loop is 95.

The basic AC characteristics of SLIC 10 are now described. In response to differential AC signals appearing at Tip and Ring terminals 12 and 14 from the subscriber loop a single-ended output signal is produced at $T_X$. The differential signal at Tip and Ring appears as two, out of phase signals at the inputs of A1 and A2 mirrors 54 and 60. The A1 mirror input signal produces a corresponding output therefrom that is supplied as an input to A3 mirror 62 and inverted to appear at the output of thereof where it is summed in phase with the corresponding output signal from A2 mirror 60 to appear at $T_X$. An AC signal received at the unidirectional receive path to appear as a current supplied to $R_X$ is passed through transistor 38 and multiplied by the B1 and B2 mirrors to appear as a differential signal across Tip and Ring terminals, as understood, to drive the subscriber loop.

A problem, as discussed previously, inherent in SLIC 10 above results if the magnitude of the longitudinal signal current should exceed the magnitude of the loop current supplied by the SLIC. Longitudinal signals are common-mode signals appearing at Tip and Ring which, for example, may be induced onto the telephone lines. The problem arises as operational amplifiers 22 and 44 in conjunction with respective Darlington transistors 20 and 42 can conduct in one direction only. Thus, for instance, if a longitudinal signal appears across Tip and Ring having a polarity to pull current out of the Ring terminal, current would be sourced only until amplifier 44 is completely shut off. However, if the peak level of the longitudinal signal is greater than the loop current and amplifier 44 is turned off the operation of SLIC 10 is deleteriously affected.

Figure 2:
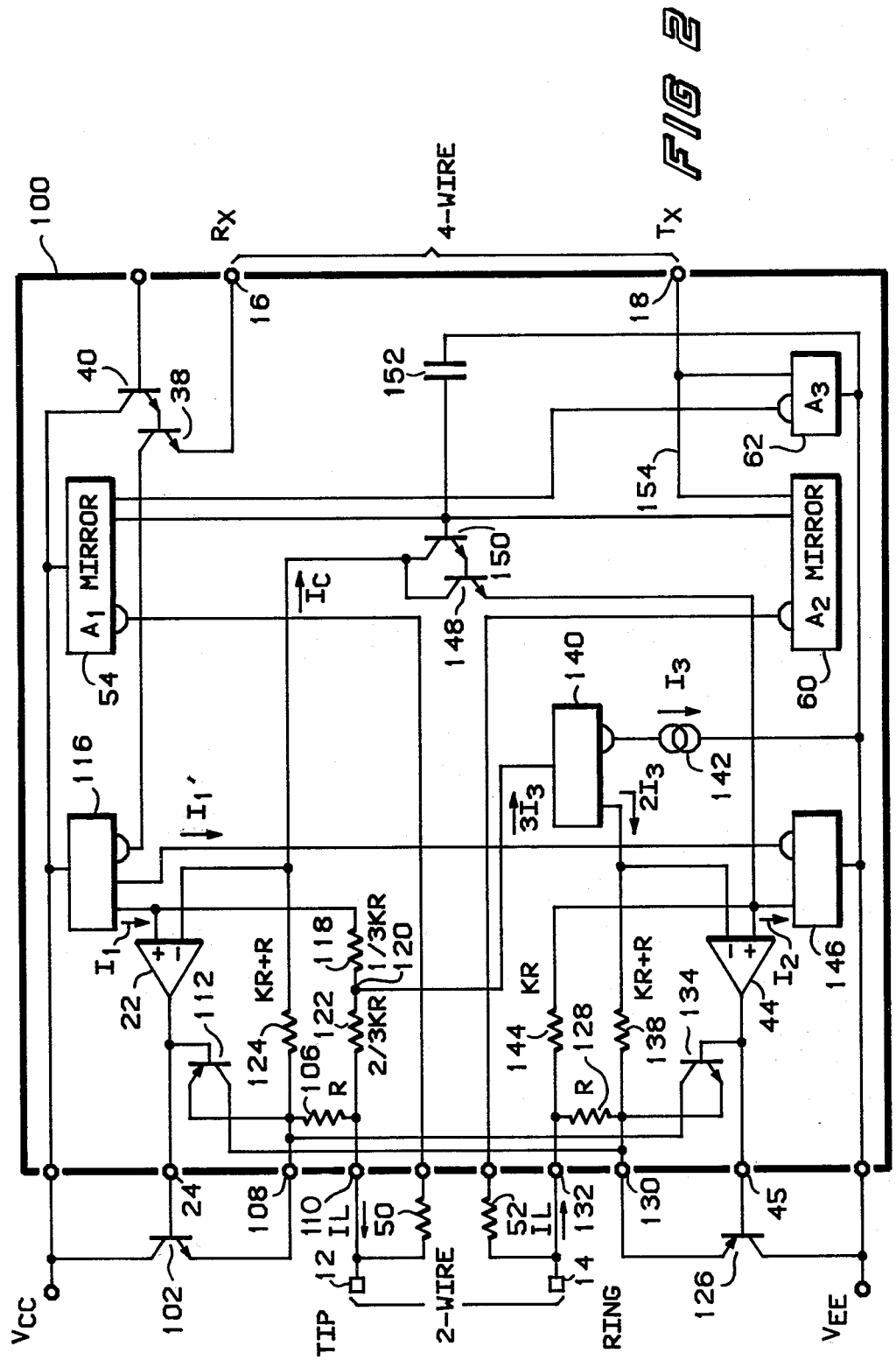
FIG. 2 is a schematic and block diagram of a SLIC including the balanced multiplier circuit of one embodiment of the present invention.

Turning to FIG. 2 there is shown a SLIC of the type referred to above which overcomes the above problem while ensuring that the DC midpoint voltage of the load is maintained halfway between $V_{CC}$ and $V_{EE}$. It is to be understood that components of FIG. 2 corresponding to like components in FIG. 1 are designated with the same reference numerals. Although SLIC 100 of FIG. 2 responds to differential AC signals in the same manner as SLIC 10 of FIG. 1 the longitudinal characteristics of the SLIC have been modified by the illustrated balanced current multiplier circuit. As shown, the output of amplifier 22 is connected at external terminal to the base of NPN transistor 102 which has replaced PNP Darlington transistor 20. The collector of transistor 102 is returned to $V_{CC}$ with its emitter sourcing current to Tip terminal 12. A resistor 106 is coupled between the emitter of transistor 102 and Tip at terminals 108 and 110. This resistor has a value R ohms. An internal PNP transistor 112 is provided having its base coupled to the output of amplifier 22, its emitter coupled at terminal 108 to the emitter of transistor 102 and its collector coupled to pin 130. A current mirror 116 is provided having an input coupled to the collector of transistor 38, and a first output coupled both to the non-inverting input of amplifier 22 and to one end of resistor 118 which has a value $\frac{1}{3}$ KR ohms. The other end of resistor 118 is connected at node 120 and through resistor 122 to terminal 110. Resistor 122 has a value $\frac{2}{3}$ KR ohms. The inverting input of amplifier 22 is returned through resistor 124 to resistor 106 at terminal 108. Resistor 124 has a value of KR+R ohms.

Similarly, the output of amplifier 44 is coupled at terminal 45 to the base of single PNP transistor 126. Transistor 126 replaces NPN Darlington transistor 42 (FIG. 1) and has its collector returned to $V_{EE}$ and its emitter coupled to Ring terminal 14 for sinking current therefrom through resistor 128 which is connected between terminals 130 and 132. Resistor 128 is matched to resistor 106 having a value of R ohms. An internal NPN transistor 134 is provided having its emitter coupled at terminal 130 to the emitter of transistor 126, its base to the output of amplifier 44 and its collector to pin 108.

Resistor 138, having a value KR+R ohms, is connected between one end of resistor 128 at terminal 130 and the inverting input of amplifier 44. A second mirror circuit 140 has a reference input connected at node 120 and an output connected to the inverting input of amplifier 44; the input of mirror 140 is coupled to current source 142 which sources a current $I_3$. A resistor 144 is connected between the other side of resistor 128 at terminal 132 and the non-inverting input of amplifier 44. A third mirror circuit 146 having an input coupled to a second output of mirror 116 and an output connected to the non-inverting input of amplifier 44. A current compensation bias circuit comprising Darlington connected current sensing NPN transistors 148 and 150 is shown wherein the collector-emitter paths are connected between the inverting and non-inverting inputs of amplifiers 22 and 44 respectively. The base of transistor 150 is coupled to second outputs of A1 and A2 mirrors 54 and 60. A frequency compensation capacitor 152 is provided on-chip of SLIC 100.

As mentioned above, SLIC 100 responds to differential AC signals in substantially the same manner as described for SLIC 10. Thus, the differential signal appearing at Tip and Ring supplied from the subscriber loop produces two out of phase signals into A1 and A2 mirror circuits 54 and 60. The A1 signal is inverted by A3 mirror 62 and summed with the output signal from A2 mirror 60 appearing via lead 154 at the output of A3 mirror 62 to appear as a single-ended output signal at $T_X$. Likewise, a single-ended received current signal at $R_X$ is supplied through transistor 38 to an input of current mirror 116 to drive both amplifiers 22 and 44 to produce a differential signal across Tip and Ring.

The DC characteristics of the balanced current multiplier circuit ensure that the load voltage across Tip and Ring is midpoint between $V_{CC}$ and $V_{EE}$ and ensures that maximum expected longitudinal signal currents can be handled by the SLIC 100 such that operation of the circuit is not deleteriously affected. Thus, with a load coupled across Tip and Ring a loop load current $I_L$ flows through the load, resistors 50, 52, the B mirrors comprising transistors 102, 126 and amplifiers 22 and 44 as aforedescribed with respect to SLIC 10 of FIG. 1. The loop current sensed through resistors 50 and 52 turn on the control outputs of A1, A2 and A3 mirrors to render transistor 38 conductive as before described. This in turn turns on mirror 116 to supply a current $I_1$ which is equal to $I_L/K$, where K is a multiplication factor. The current gain of the B mirror circuit comprising amplifier 22, transistor 102, resistors 106, 118, 122 and 124 is made equal to K whereby the current sourced to Tip is $I_L$. Similarly, the current gain of the B mirror comprising amplifier 44, transistor 126, resistors 128, 138 and 144 is made equal to K such that a current $I_2$ that is sourced at the non-inverting input of amplifier 44 and which is equal to $I_L/K$ appears at the controlled output of mirror 146 which is rendered active by an input current supplied thereto from mirror 116. Resistors 106, 118, 122, 124; 128, 138, 144 form first and second negative feedback paths between the outputs, inputs and the Tip and Ring terminals respectively.

At balance, assuming no longitudinal current, $I_1$ is forced to be equal to $I_1'$ if the gain ratio between the input and the two control outputs of mirror 116 are made equal. This causes the current $I_1'$ to be sourced to the input of mirror 146 to produce the current $I_2$ which is equal to $I_1'$ and therefore equal to $I_1$.

Longitudinal suppression is provided by the C-circuit comprising current mirror 140, current source 142, and Darlington connected transistors 148 and 150. Any longitudinal voltage appearing at Tip and Ring is converted by sense resistors 50 and 52 into longitudinal currents. For example, if a longitudinal voltage is generated that causes the voltage at Tip and Ring to decrease, the current through resistor 50 will be forced to increase while the current through resistor 52 is decreased. This condition increases the current supplied at the output of mirror 54 to the base of transistor 150 while the output from mirror 60 coupled thereto is decreased. Subsequently transistor 150 and 148 are rendered more conductive. Hence, the magnitude of IC (which is equal to $2I_3$ at balance) increases which will cause the output of amplifier 22 to become more positive as well as the output of amplifier 44. Thus, the voltages at Tip and Ring are increased which offset the longitudinal voltage appearing thereat. In a like manner, if a longitudinal voltage appearing at Tip and Ring tends to increase the voltage magnitudes thereat, transistors 148 and 150 are rendered less conductive to cause the outputs of amplifier 22 and 44 to both swing negatively. The C-circuit also ensures that the midpoint load voltage is one-half supply voltage due to any mismatch between components of the balanced multiplier circuit.

A significant advantage of SLIC 100 over prior art SLICs of the type shown in FIG. 1 is that SLIC 100 can operate with larger longitudinal currents in the subscriber loop than the prior art SLICs. For instance, SLIC 10 can function only until the magnitude of any longitudinal current becomes substantially equal to the loop current provided by the open-collector output devices of the SLIC. As an example, a longitudinal current produced at Ring and Tip that sinks current from the Ring will shut off transistor 42 as soon as loop current is no longer available thereto. However, SLIC 100 can handle a longitudinal current having a peak magnitude equal to $2KI_3$ with either transistor 112 or 134 (depending on the polarity of the longitudinal voltage) being rendered conductive when the peak magnitude of the longitudinal currents have shut off either transistor 102 or 126. Hence, SLIC 100 can function properly even with greater longitudinal signals than other electronic subscriber loop interface circuits.

Figure 3:
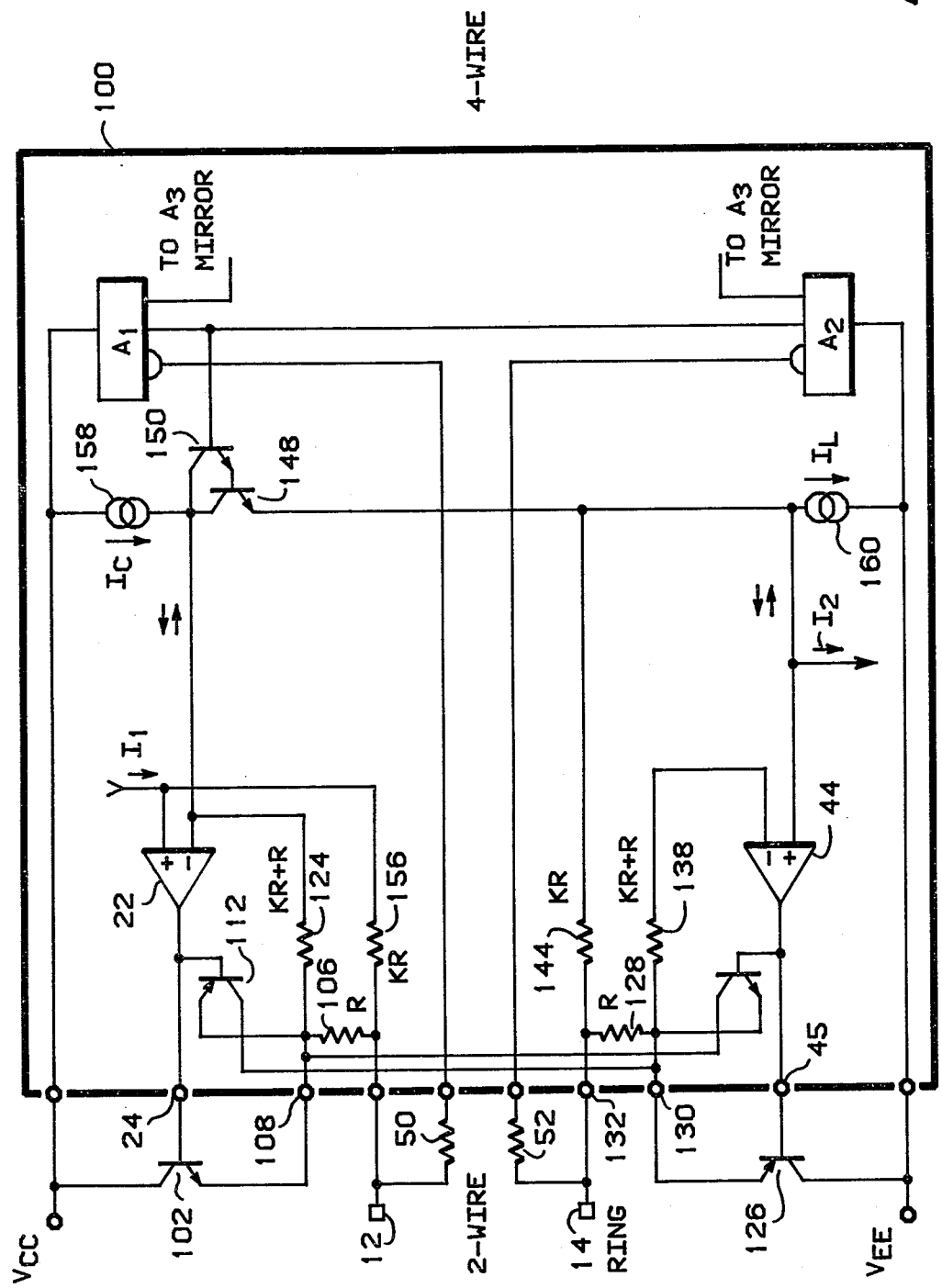
FIG. 3 is a schematic and block diagram of a balanced multiplier circuit of a second embodiment of the invention.

Turning now to FIG. 3 there is shown SLIC 100 where a modified compensation circuit (C-circuit) is utilized to provide longitudinal signal suppression. The simplified circuit of FIG. 3 is otherwise identical to SLIC 100 which has been described above with reference to FIG. 2 except that resistors 118 and 122 have been combined into a single resistor illustrated as resistor 156 (FIG. 3). Additionally, SLIC 100 of FIG. 3 includes a pair of constant current sources 158 and 160 coupled between $V_{CC}$, $V_{EE}$ respectively in the collector-emitter paths of transistor 148 and 150. Longitudinal signal suppression is provided by SLIC 100 of FIG. 3 in the same manner as previously discussed. Hence, a longitudinal voltage that reduces the Tip and Ring voltage will cause the current through resistor 52 to decrease and the current through resistor 50 to increase. This condition renders transistors 148 and 150 more conductive to sink current from the inverting input of amplifier 22 while sourcing current to the non-inverting input of amplifier 44. Hence, the outputs of amplifier 22 and 44 become more positive thereby raising the voltage at Tip and Ring.

A significant aspect of the present invention is that the subscriber loop is driven from the emitters of transistors 102 and 126 whereas in the prior art the loop was driven from the collectors of a pair of Darlington transistors. Therefore, frequency compensation capacitors required by prior art SLICs are no longer needed utilizing the present invention as there is no source of collector generator poles in the high gain system. Additionally, because there are no base current errors since the loop is no longer driven from collectors of transistors there is no longer the need for Darlington transistors.

We claim:

1. In a subscriber loop interface circuit (SLIC) for providing signal conversion between a balanced subscriber loop and a pair of unidirectional transmission paths, the SLIC being adapted to receive a supply voltage including sensing circuit means coupled to first and second loop terminals having a plurality of current mirrors for producing a direct current drive signal in response to a load being connected across the loop terminals and current amplification means coupled to the first and second loop terminals which is responsive to the direct current drive signal for supplying loop current to the load which is proportional to the direct current drive signal, the improvement comprising the current amplifier means including a pair of current difference amplifiers which form a balanced current multiplier with each current difference amplifier being coupled between a respective one of the first and second loop terminals and the sensing circuit means, each current difference amplifier including means for both sourcing and sinking current at the respective loop terminal coupled therewith for providing rejection of longitudinal signals having current magnitudes that exceed the magnitude of the loop current that occur across the loop terminals.

2. The SLIC of claim 1 wherein:
the first one of said pair of current difference amplifiers includes a first operational amplifier having first and second inputs and an output, and first feedback circuit means coupled between said output and said first and second inputs of said first operational amplifier, said first current difference amplifier sourcing the loop current to said first loop terminal wherein the magnitude of the loop current is K times the difference of the currents appearing at said inputs of said first operational amplifiers; and
the second one of said pair of current difference amplifiers includes a second operational amplifier having first and second inputs and an output, and a second feedback circuit means coupled between said output and said first and second input of said second operational amplifier, said second current difference amplifier sinking the loop current from said second loop terminal, the magnitude of the loop current sunk by said second current difference amplifier being substantially equal to the loop current sourced by said first current difference amplifier.

3. The SLIC of claim 2 wherein said balanced current multiplier circuit further includes compensation circuit means adapted to be coupled with the sensing circuit means and being operatively coupled between said second input of said first operational amplifier and said first input of said second operational amplifier for maintaining the voltage appearing at said first and second subscriber loop terminals centered at one-half said supply voltage and providing rejection of said longitudinal signals.

4. The SLIC of claim 3 wherein said first feedback circuit means includes a first resistor adapted to be coupled between said output of said first operational amplifier and said second input thereof, a second resistor adapted to be coupled between said first subscriber loop terminal and said first input of said first operational amplifier, and a third resistor adapted to be coupled between said output of said first operational amplifier and said first subscriber loop terminal.

5. The SLIC of claim 4 wherein said second feedback circuit includes a fourth resistor adaptive to be coupled between said output of said second operational amplifier and said second input thereof, a fifth resistor adapted to be coupled between said second subscriber loop terminal and said first input of said second operational amplifier, and a sixth resistor being adapted to be coupled between said output of said second operational amplifier and said second subscriber loop terminal.

6. The SLIC of claim 5 wherein:
said means for both sourcing and sinking current of said first current difference amplifier includes;
a first transistor of a first conductivity type having first, second and third electrodes, said third electrode being adapted to be connected to said output of said first operational amplifier, said first electrode coupling said first and third resistors to said output of said first operational amplifier, said second electrode being adapted to receive a first potential, and
a second transistor of second conductivity type having first, second and third electrodes, said third electrode being connected to said output of said first operational amplifier, said first electrode being adapted to be connected to said first electrode of said first transistor;
said means for both sourcing and sinking current of said second current difference amplifier includes;
a third transistor of said second conductivity type having first, second and third electrodes, said third electrode being adapted to be connected to said output of said second operational amplifier, said first electrode coupling said fourth and sixth resistors to said output of said second operational amplifier, said second electrode being adapted to receive a second potential, said first electrode also being coupled to said second electrode of said second transistor, and
a fourth transistor of said first conductivity type having first, second and third electrodes, said third electrode being connected to said output of said second operational amplifier, said first electrode being adapted to be connected to said first electrode of said third transistor, and said second electrode being coupled to said first electrode of said first transistor.

7. The SLIC of claims 5 or 6 wherein:
the sensing circuit means includes:
(a) first current mirror means having an input and at least one output for producing a current at said output having a predetermined relationship to loop terminal for varying the magnitude of said output current therefrom accordingly;
(b) second current mirror means having an input and at least one output for producing a current at said output having a predetermined relationship to the input current thereof, said input being adapted to be coupled to said second subscriber loop terminal, said second current mirror being responsive to a longitudinal signal appearing at said second subscriber loop terminal for varying the magnitude of said output current therefrom accordingly; and said compensation circuit means includes current sensing means coupled between said second and first inputs of said first and second operational amplifiers respectively which is rendered responsive to any difference in the magnitudes of said output currents from said first and second current mirror means for shifting the voltages appearing at said first and second subscriber loop terminals to reject said longitudinal signals appearing thereat.

8. The SLIC of claim 7 wherein said current sensing means include a pair of transistors of said first conductivity type connected as a Darlington transistor having a first, second and a control third electrode(s), said third electrode being coupled to said at least one output of both said first and second current mirror means, said first electrode being coupled to said first input of said second operational amplifier, said second electrode being coupled to said second input of said first operational amplifier.

9. The SLIC of claim 8 including a first current source for supplying a first current to said second electrode of said Darlington transistor and a second current source for sourcing a second current from said first electrode of said Darlington transistor.

10. The SLIC of claim 9 wherein:

said first and fourth resistors each have a value $KR+R$ ohms;

said second and fifth resistors each have a value $KR$ ohms; and said third and sixth resistors each have a value $R$ ohms.

11. The SLIC of claim 8 wherein said second resistor of said first feedback circuit means includes seventh and eighth serially connected resistors.

12. The SLIC of claim 9 wherein said compensation circuit means includes a third current mirror means having an input, an output and a reference terminal, said reference terminal being coupled between said seventh and eighth serially connected resistors such that a current is supplied to said third current mirror of a predetermined magnitude in the absence of any longitudinal signals, said output being coupled to said second input of said second operational amplifier; and a current source for sourcing current at said input of said third current mirror means, the magnitude of said output current and the magnitude of said input current of said third current mirror means having a predetermined ratio wherein the sum of said respective currents is equal to the magnitude of said current supplied to said reference terminal of said third current mirror means.

13. The SLIC of claim 11 wherein:

said first and fourth resistors each have a value $KR+R$ ohms;

said third and sixth resistors each have a value $R$ ohms;

said fifth resistor has a value $KR$ ohms;

said seventh resistor has a value $\frac{2}{3} KR$ ohms; and said eighth resistor has a value $\frac{1}{3} KR$ ohms.

* * * * *